United States Patent Office 3,709,828
Patented Jan. 9, 1973

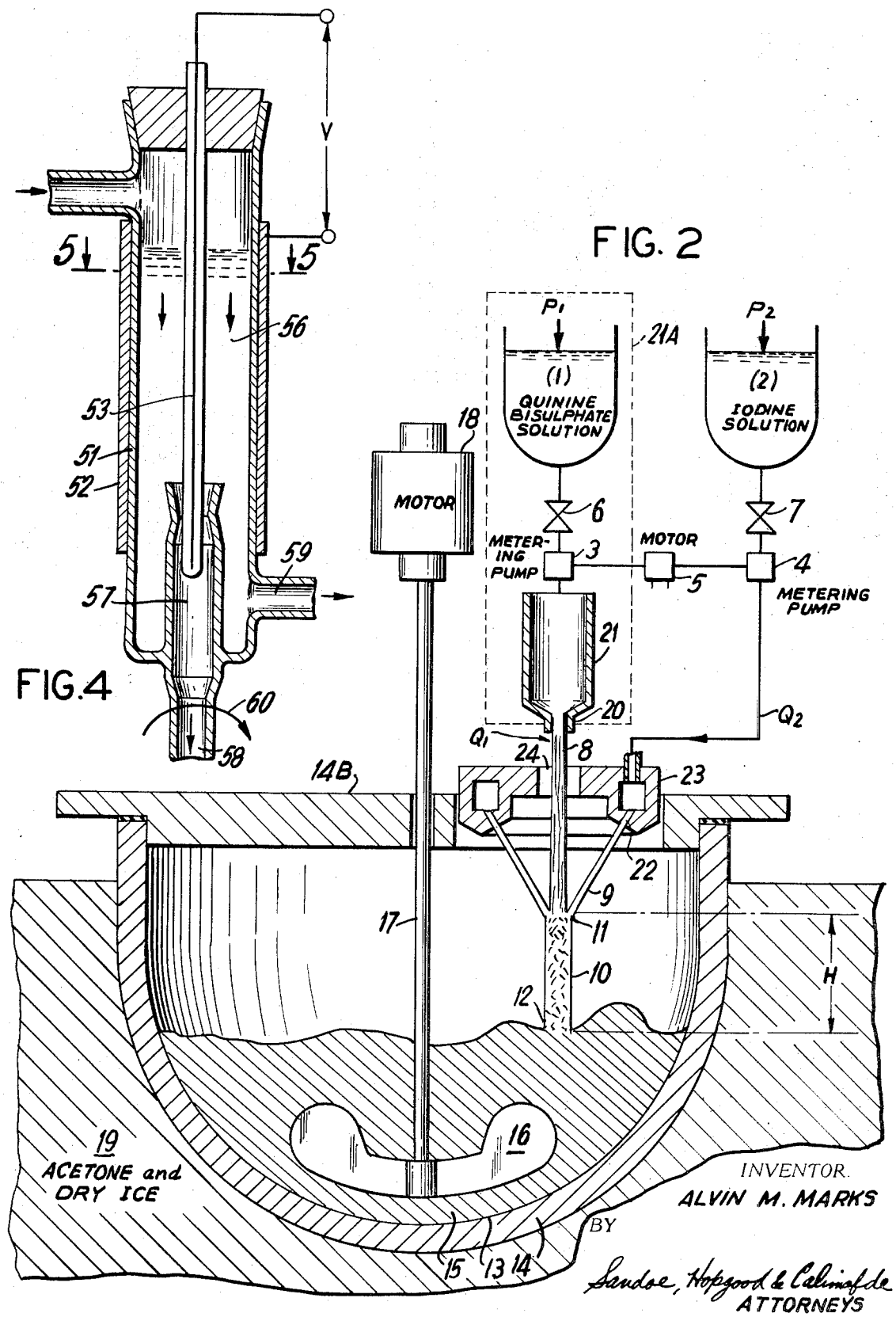

3,709,828
METHOD FOR FORMING SUBMICRON
DIPOLE PARTICLES
Alvin M. Marks, 166—35 9th Ave.,
Whitestone, N.Y. 11357
Continuation-in-part of application Ser. No. 378,836,
June 29, 1964. This application Feb. 13, 1970, Ser.
No. 11,176
Int. Cl. F21v 9/00
U.S. Cl. 252—300                                    10 Claims

ABSTRACT OF THE DISCLOSURE

Submicron dipole particles are produced by providing at least two reactant fluids which, when mixed together in substantially stoichiometric relationship, form a dipole precipitate by controlling such variables as formation time and limiting the volume of the reacting liquid to a predetermined volume. A preferred method resides in impinging a jet stream of at least one of said reactant fluids against a jet stream of at least one other of said reactant fluids to effect a mixing of said fluids in a resultant stream over a predetermined distance at a predetermined flow rate conducive for providing by reaction dipoles having a desired average dimension.

---

This invention relates to a method and apparatus for forming submicron dipole particles of controlled average size having particular use as suspensions in optical devices in which the optical properties of said devices are controlled by electrically or magnetically orienting or disorienting dipole particles in accordance with the optical property desired.

RELATED COPENDING APPLICATION

This application is a continuation-in-part of parent application Ser. No. 378,836, filed June 29, 1964, now U.S. Pat. No. 3,512,876, entitled "Dipole Electro-Optic Structures and Method" in the name of Alvin M. Marks. According to the parent application, it is known to employ a suspension of orientable dipolar particles as a light-controlling element, and to orient the particles in such a suspension by the application of an external electric or magnetic force field. Devices of this general type that were previously proposed, however, have had little use because of a number of important deficiencies. One of such prior art shortcomings was the tendency of the oriented particles to coagulate or clump together, rather than remain uniformly dispersed. Another shortcoming was that the optical properties of the devices, either in the oriented or disoriented condition, were of a low order. Thus, when such a suspension was switched from maximum transmittance to minimum transmittance, or maximum reflectance to minimum reflectance, the obtainable ratios of these transmittances, or reflectances, were too small. Moreover, clear suspension of dipolar particles, free from light scatter, were not available. Furthermore, the response of such a system to an applied electric or magnetic force field tended to be slow. Orientation and disorientation control techniques were lacking. Consequently, prior art devices were not suitable for incorporation into most electro-optical systems. In general, the underlying physical laws governing electrodichroic systems were not well understood, and the physical parameters of such systems were relatively unknown.

According to the copending case, a light, controlling device may be provided to overcome the foregoing shortcomings so long as the minute dipole particles in the suspending medium have at least one dimension not of the order of $\lambda/2n$ and at least one other dimension not exceeding $\lambda/10n$ (where $\lambda$ is the wavelength of light and $n$ is the index of refraction of the suspending medium), so that when a force field is applied to the suspension, the dipole particles are oriented in the desired direction and when the force field is removed, the dipole particles become randomly oriented in a reasonably short time.

The random motion of micron-sized particles is known as Brownian motion. Brownian motion is due to random molecular impacts, which is a manifestation of thermal energy, and which is proportional to absolute temperature.

The Brownian motion randomly disorients previously oriented dipole particles, which is herein termed "relaxation." Thus, relaxation is defined as the disorientation of dipoles in the absence of an aligning field of previously aligned dipole particles. Starting with dipole particles aligned normal to the plane of a layer in a state of maximum transmittance, the transmittance decreases asymptotically toward minimum transmittance in the random state.

The dipole particles found particularly useful in optical devices are herapathite dipole crystals. However, in order to obtain the required average size of such crystals so as to provide short relaxation times when the force field is removed, rather sophisticated size separation techniques have to be employed.

THE PROBLEM CONFRONTING THE ART

The present herapathite dipole suspensions comprise dipoles generally having an average length of about 6000 A. in a fluid having a viscosity of 180 millipoise, which dipoles have a relaxation time $\tau_B$ of about 5000 $\mu$s. A relaxation time of less than 135 $\mu$s would be particularly desirable. However, an increase in speed of the herapathite suspension of about 36 times would be required to achieve such short relaxation times. The ideal desired length of the crystal is $\lambda/2n$ or about 1880 A. for peak visual response.

At the present time, submicron herapathite dipoles are grown from a supersaturated solution. The herapathite dipole crystals are prepared by a process in which two reactants are added together and rapidly cooled, forming a supersaturated solution which immediately crystallizes into many submicron crystals. The solution usually contains a small amount of polymer to keep the crystals separated in the suspension. With this process, the dipole crystals are generally formed with an average length of about three times the required length of 1880 A.

The reactants form the supersaturated solution. The dipole crystals grow in a large body of fluid, their size being limited according to the population of initial nuclei, and according to the rate of cooling, exhaustion of solute, and solubility.

The variables governing the particle size are concentration, cooling rate, presence of nuclei, time, impurities and dissolved polymer. With the foregoing, crystals of various sizes are produced, most of which are above the optimum dimension. The dipole suspensions so produced have been centrifuged to select smaller dipoles with considerable success. A disadvantage is that centrifuging results in a loss of herapathite. Initially, the centrifuging results in a size range averaging about 6000 A., much above the optimum 1880 A., and an optimum length to width ratio of 25. On further centrifuging, the particles remaining in suspension are small broken fragments which have less than the optimum required length/width ratio, which results in an electro-dichroic ratio which is too small, generally less than 10. Consequently, there is an optimum time and speed for centrifuging to produce the best result. Centrifuging alone is not sufficient to enable the production of the desired particle sizes.

Thus, the problem resides in providing new precipitation techniques for producing submicron dimension to as close to 1880 A. as is possible having the desired length/width ratio.

It is thus an object of the invention to provide improved methods for producing dipole particles of the desired submicron size.

Another object is to provide various apparatus embodiments for carrying out the methods of the invention.

These and other objects will more clearly appear when taken in conjunction with the following disclosure and the accompanying drawings, wherein:

FIG. 2 illustrates in cross section a proportioning jet crystallizer as one apparatus embodiment of the invention;

FIG. 4 is illustrative of a continuous electrophoretic centrifuge separator for separating large particles from smaller particles.

BROAD STATEMENT OF THE INVENTION

Figure 1:
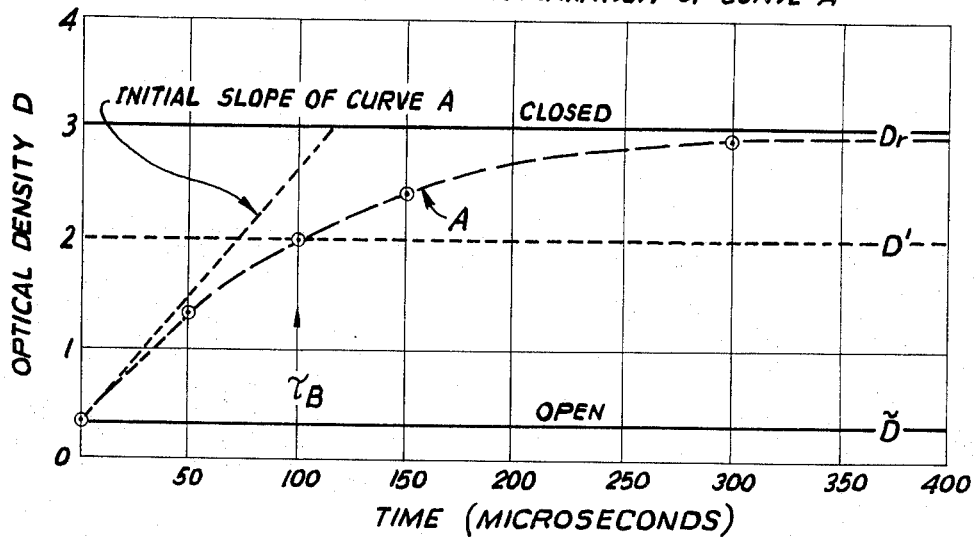
FIG. 1 is a graph showing optical density as a function of time for a herapathite suspension during relaxation from an aligned state after voltage shutoff, with particular reference to Curve A.

Broadly speaking, the method aspects of the invention reside in providing at least two reactant fluids which when mixed together in substantially stoichiometric relationship, relative to the reactants present, form a dipole precipitate. The preferred mixing method resides in impinging a jet stream of at least one of said reactant fluids against a jet stream of at least one other of said reactant fluids to effect a mixing of said fluids in a resultant stream over a predetermined distance at a predetermined flow rate conducive for providing dipoles having the desired average dimension.

The reactant fluids may be solutions in which the jet stream of one reactant solution impinges upon the jet stream of another reactant solution; or the reactant fluids may be in the form of charged aerosols, the charged aerosol stream of one reactant solution being directed against an oppositely charged aerosol stream of another reactant solution, the size of the resultant dipole particles being less than the average size of the merged aerosol particles, depending upon the residence time of the merged streams before they fall and are collected in a reservoir in the former case; and upon the size of the charged aerosol droplets in the latter case.

The broad apparatus embodiment comprises means for storing a first reactant fluid, means for storing a second reactant fluid, a reaction chamber for receiving the reactant fluids, means for separately feeding a jet stream of each of said first and second reactant fluids to said reaction chamber in impinging relationship to each other within said chamber at predetermined flow rates over a predetermned distance after impingement as the impinged streams mix and fall to the bottom of said chamber, and means associated with said chamber for mixing and cooling the resulting fluid at the bottom of the chamber. The rapid cooling to a low temperature greatly increases the supersaturation; results in the formation of a great many nuclei of crystallization, and produces a great many small submicron crystal dipoles rather than fewer unwanted large crystals.

Before going into the detail aspects of the invention, it would be helpful at this time to discuss the variables which are considered in determining the desirable properties of dipole particles.

Relaxation time $\tau_B$ of a dipole suspension is proportional to the cube of the particle length, $L^3$, the viscosity, $\eta$, a shape factor, $a_0$, and also inversely proportional to the absolute temperature, $1/T$. The shape factor $a_0$ and the temperature vary very little and need not be considered in making certain estimations.

The equation for optical density versus time during relaxation from the aligned state to the random state is as follows:

$$D = \tilde{D} + (D_r - \tilde{D})(1 - e^{-t/\tau_B}) \quad (1)$$

where:

$D$ = optical density at time $t$
$D_r$ = optical density in random state
$\tilde{D}$ = optical density in open state with voltage V
$D'$ = optical density at time $t = \tau_B$
$\tilde{V}$ = applied potential difference
$t$ = time from voltage shutoff
$\tau_B$ = exponential relaxation time constant For the situation where $t = \tau_B$, Equation 1 reduces to:

$$D' = \tilde{D} + (D_r - \tilde{D})[1 - (1/e)] = 0.378\tilde{D} + 0.632 D_r \quad (2)$$

The slope, or change in optical density per unit of time ($\mu$s), is:

$$(dD/dt) = [(D_r - \tilde{D})/\tau_B] e^{-t/\tau_B} \quad (3)$$

The initial slope at time $t = 0$, is:

$$(dD/dt)_{t=0} = (D_r - \tilde{D})/\tau_B \quad (4)$$

Table I was computed from Equation 1 for $D_r = 3.0$, $\tilde{D} = 0.3$ and $\tau_B = 100$ $\mu$s.

TABLE I

Optical density versus time

| D. | $t$, $\mu$ sec. |
| --- | --- |
| 0.3 | 0 |
| 1.36 | 50 |
| 2.0 | 100 |
| 2.4 | 150 |
| 2.9 | 300 |

Curve A in FIG. 1 is ploted from Table I.

The time rate of change of optical density at $t = 0$ is computed from (4):

$(dD/dt)_{t=0} = 2.7/100 = 0.027$ optical density units/$\mu$s

Given: maximum slope $dD/dt = 0.02$ OD/$\mu$s the initial slope of curve A, FIG. 1.

$D_r = 3.0$ (random)

$\tilde{D} = 0.3$ (open)

Find: $\tau_B$, the relaxation time for the specified curve A. From (4):

$\tau_B = (D_r - \tilde{D})/(dD/dt)$
$\tau_B = 2.7/(0.02) = 135$ $\mu$s

It is desirable in producing dipole electro-optic structures of high efficiency to increase the mobility speed of the herapathite dipole suspension by a factor of approximately 50. Such an increase in speed will provide a relaxation time constant less than 135 $\mu$s.

One way to accomplish the foregoing is to decrease the length of the dipole by a factor of 3 from an average length of about 6000 A. to somewhat less than 2000 A. and to decrease the fluid viscosity from a value of 180 millipoise to 90 millipoise (i.e. decrease it 2 times) or less which will result in a speed increase by the following factor: $3^3 \times 2 = 54$ times.

To accomplish the foregoing, the main problem is to decrease the particle length while retaining a length to width ratio of the dipole particle of at least 15. The production of particles of such character requires the development of new methods and apparatus for controlling the precipitation and size of the dipole particles. In this connection, the detail aspects of the invention are as follows:

DETAILS OF THE INVENTION

The production of herapathite crystal suspensions is disclosed in U.S. Pat. No. 1,918,848 (issued July 18, 1933) in the name of Edwin H. Land, using as reactants a solution of bisulphate of quinine and a solution of iodine. Heretofore, in the manufacture of herapathite submicron crystals, the iodine and quinine bisulphate solutions were added to a beaker submerged in acetone in Dry Ice and stirred with an electric stirrer. The results obtained varied greatly: sometimes very small crystals were formed; sometimes larger crystals were formed; usually a mixture of both. The variability with this method is caused by difficulty in manually controlling the variables during the mixing of the components. The control of variables during mixing is important for obtaining submicron particles of controlled size. It is probable that the crystal growth occurs in the small time interval during which the components are mixed and cooled down to the wall temperature of the beaker. The effect of the cooling is to slow down or stop the crystal growth. Working with bulk solutions which are then mixed together is disadvantageous because of the difficulty of controlling the variables. Thus, a means is required to effect almost instantaneous mixing, followed by a controlled small time interval to allow a specified crystal growth to occur, following which further growth is inhibited by rapid cooling.

One apparatus embodiment provided by the invention for carrying out the foregoing is shown in FIG. 2 which is illustrative of a proportioning jet crystallizer. A first vertical fluid jet 8 of reactive component quinine bisulphate solution (1) is passed through the apex of a conical fluid sheet comprising a second jet 9 of reactive component iodine solution (2). Components (1) and (2) are introduced into reaction chamber or beaker 14 in a stoichiometric ratio by metering pumps 3 and 4 actuated by the same motor 5 to provide feed streams $Q_1$ and $Q_2$. Electric valves 6 and 7 are externally operated to initiate the process. When the valves 6 and 7 are opened, the axial quinine bisulphate jet 8 and the conical iodine jet 9 issue from their respective orifices. Jet 8 issues from a single small circular orifice 20 in the tube 21. The conical jet 9 issues from an annular orifice 22 within an especially shaped orifice head 23 which has a central hole 24 as shown. The hole 24 is large enough to permit jet 8 to pass through into the reaction chamber without touching orifice head 23. The height H and the pressures $P_1$ and $P_2$ are adjustable so as to control the time of formation of the submicron crystals. The quine bisulphate supply system is jacketed as shown phantomly by dotted lines 21A to maintain the fluid temperature at about 40° C. to prevent premature crystallization. The jet mixing head 23 may also be included in the heating system if it is found desirable. The downwardly directed jets intersect at a predetermined point in the chamber, depending upon the height H of the mixture desired. Instantaneous mixing occurs and the growth of the submicron herapathite crystals commences. The time required for the mixture to travel the vertical distance H is $t'$. The time $t'$ may be controlled by adjusting the vertical downward velocity of the two jets after mixing. This vertical velocity controlled by the pressure applied to the jets.

The mixed jet 10 is ejected vertically downward from the mixing position 11 toward the base of reaction chamber 14 at level 12 in a time $t'$, the chamber being sealed by a cover 14A. The submicron crystals grow during the time $t'$. The time $t'$ may be varied, for example from 5 to 500 milliseconds by adjusting the mixing height H and the pressure at the nozzles. The wall 13 of chamber 14 is contacted by the crystallizing jet mixture. The chamber 14 is partly submerged in an acetone-Dry Ice fluid 19. The herapathite mixture 15 is rapidly cooled or refrigerated by contact with the wall 13 and the submicron particles stop growing. The cooling or refrigerating effect increases the supersaturation, forms a great many nuclei and many small crystals and also inhibits the growth of large crystals.

The crystal suspension forms a paste at the bottom of the beaker. The paste is continually stirred by a stirrer 16, actuated by the motor 18.

To stop the submicron particles from growing before they become too large, a fluid with a low vapor pressure is added, preferably a nonionic fluid, while the stirring is continued. Examples of such fluids are dioctylphthalate, dimethyl sebacate, diisooctyl adipate, Celluflex 23 (alkyl epoxy stearate), or other well known low vapor pressure fluids or moderate low vapor pressure fluids, such as butyl lactate, in which the dipole is insoluble and in which the protective polymer is soluble.

Figure 3A:
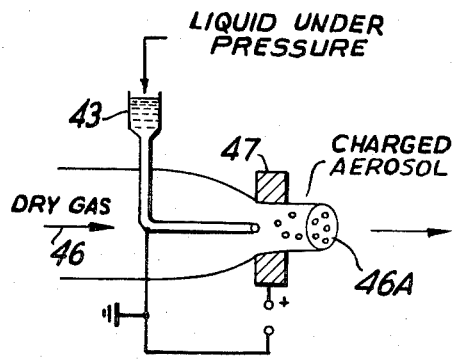
FIG. 3A is a fragment in cross section showing how a charged aerosol is produced.
Figure 3:
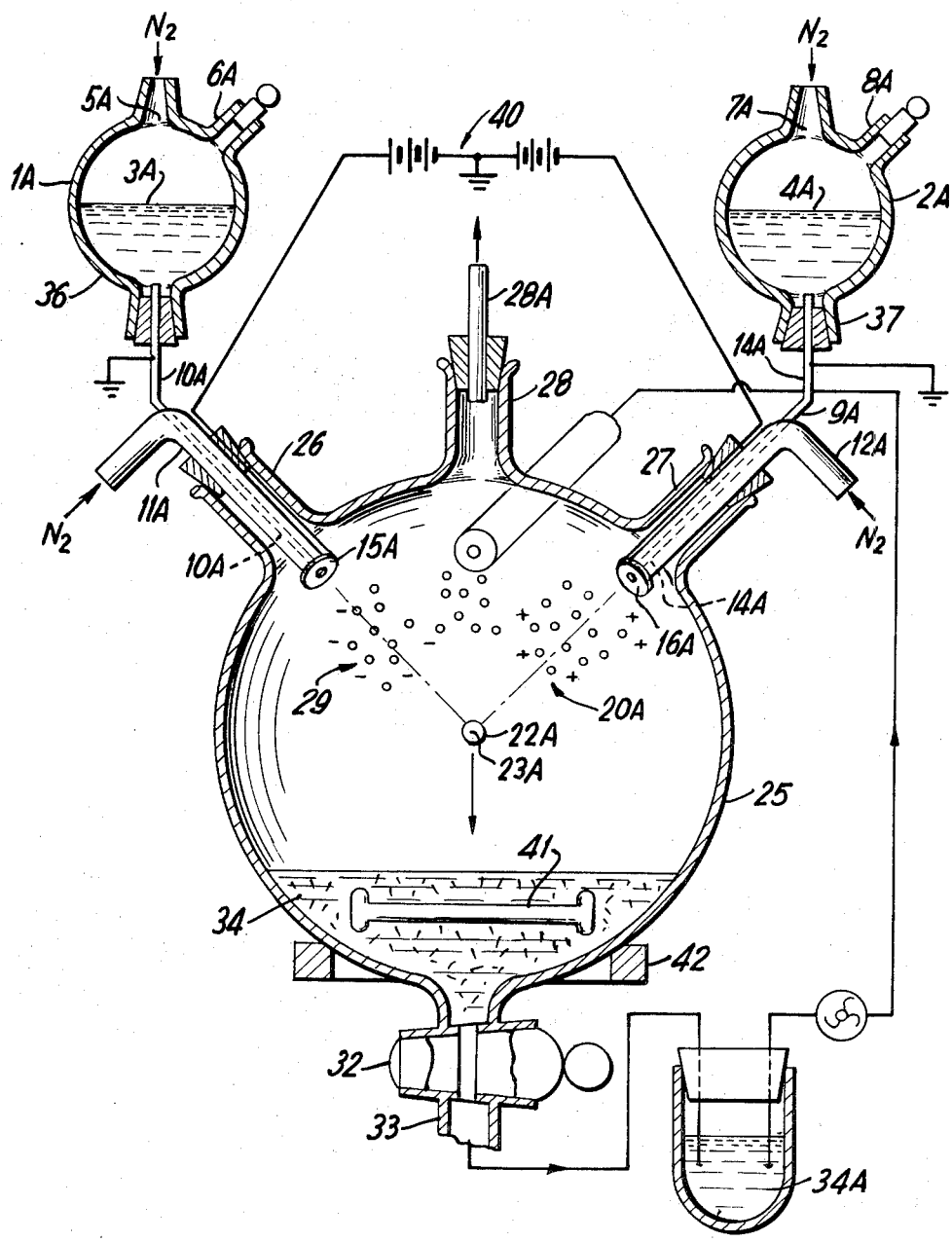
FIG. 3 depicts in cross section a charged aerosol crystallizer as illustrative of another apparatus embodiment of the invention.

A device of particular utility is that shown in FIG. 3 which consists of a three-necked glass reaction chamber 25 having a bottom opening 33 connected to the chamber by means of a glass valve 32. The bottom of the flask contains low vapor fluid 34 as disclosed above, or a fluid of a somewhat greater vapor pressure, such as butyl lactate. The chamber is adapted to produce charged aerosols to be described hereinafter.

Work with charged aerosols indicates that alcohol solutions can be readily dispersed to form positive or negative charged aerosol droplets from a capillary needle supported in a gas stream and maintained at a potential with respect to a ring electrode in its vicinity, the capillary being along the axis of flow and the said axis passing through the ring electrode.

In FIG. 3, the feed chamber 1A has a gas inlet 5A maintained under pressure with nitrogen gas and a stoppered entrance neck 6A for introducing one of the reactants 3A which is a solution of iodine in an alcohol. In a similar way, feed chamber 2A contains an inlet 7A also maintained under pressure with nitrogen gas and a stoppered entrance neck 8A for introducing solution 4A which is quinine bisulfate and nitrocellulose in methanol and an ester. The bottom of feed chamber 1A has an exit neck 36 through which the capillary tube 10A communicates with fluid 3A. In a similar way, the feed chamber 2A has an exit neck 37 supplied with a stopper through which passes the capillary tube 9A. Surrounding the capillary tubes 9A and 10A are somewhat larger tubes 11A and 12A which are maintained under gas pressure, being supplied with nitrogen which exits as a jet in the vicinity at the end of the capillary tubes into the main chamber area of vessel 25. Vessel 25 is provided with necks 26 and 27 into which the capillary aerosol apparatus is inserted. There are two such devices as shown in FIG. 3 which eject aerosols as a stream downward at about 45° to the vertical. The aerosol stream projected downward by the airstream through pipe 14A is a positively charged aerosol of the quinine bisulfate nitrocellulose solution in the methanol-ester solution, while the iodine solution comprises the negatively charged aerosol comprising droplets of iodine dissolved in methanol or propanol or a mixture thereof. The operation of the aerosol-generating device is given below.

In order to produce the aerosol forming action, the gas streams are caused to flow through the tubes 11A and 12A producing a jet in the vicinity of the end of the capillary tubes and a positive voltage is applied to ring electrode 15A relative to the tip of capillary 10A which may, for example, be a stainless steel tube having an internal diameter of 0.2 mm. and which is grounded. In a similar manner, the capillary tube 14A, which is of the same diameter and material, is also grounded and the ring electrode 16A is maintained at a negative potential with respect to the end of the capillary tube 9A. The ring electrodes 15A and 16A are respectively connected to potential source 40, the center of which is grounded and the two outer terminals of which are respectively positive and negative as shown in FIG. 3.

The quantity of the aerosol in the fluid stream is controlled by the gas pressure on the tubes 5A and 7A in feed chambers 1A and 2A. The potential difference between the rings 15A and 16A and their respective capillary endings 10A and 9A is maintained at a voltage such as to cause the formation of submicron charged aerosol droplets 20A and 29, respectively.

The potential difference between the capillary tube and the rings may be maintained from 2 to 5 kilovolts just under the sparking potential to obtain minimum size particles. One method of charging aerosols is shown in the fragment of FIG. 3A in which a reactant fluid 43 is fed, through capillary 44 located coaxially within venturi 45 through which a gas 46, e.g. $N_2$, is fed to produce the aerosol 46A which is negatively charged by positively charged ring electrode 47, the capillary 44 being grounded.

There is no longer danger of an explosive combination of alcohol vapors with the gas since nitrogen is utilized. The only precaution required is to flush the chamber thoroughly with nitrogen before applying the voltage to the ring electrodes. Referring to FIG. 3, the positively charged submicron aerosol droplets 20A in the stream are attracted to the stream of negatively charged submicron aerosol droplets 29 and coalesce in the center of the chamber 25 forming a submicron droplet 22A which is more neutral in charge.

Since the reaction now takes place within a coalesced submicron droplet, the crystal or crystals which form within the said droplet are necessarily restricted to or less than the droplet diameter, since these crystals result from the reactants which have been mixed in a very small volume of the droplet. The crystallization is induced by the formation of a solute of decreased solubility, by causing the droplet to be cooled at a controlled rate, and by increasing solute concentration by evaporation. The cooling is induced by two factors: (1) the expansion of the nitrogen gas stream in the vicinity of the capillary endings produces a cooling effect on the gas and, therefore, on the charged aerosol particles within it; and (2) a suitable vacuum can be maintained within chamber 25 by exhausting the nitrogen gas through neck 28 and tube 28A, thus obtaining a controlled vacuum or controlled low pressure within chamber 25. Thereby, the solvents in the liquid drop surrounding the crystals evaporate, and the crystals fall into the low vapor pressure 34 at the bottom of the reaction chamber.

The suspending fluid 34 at the bottom of the container is agitated by revolving magnetic paddle 41, the revolution of the paddle 41 being induced by a revolving magnetic field from an external coil 42 in the known manner.

After the operation is complete, valve 32 is opened and chamber 25 is then subjected to pressure, thus forcing the fluid 34 out through opening 33 where it is collected in a reservoir and ready for use. If necessary, additional evaporation can be performed at this stage to remove any residual high vapor pressure solvent remaining from the coalesced droplet.

Vacuum conditions within the chamber 25 can be adjusted so that the solvent 22A of the droplet has been more or less completely evaporated away from the solute 23A before it falls into fluid 34 and is captured and suspended thereby. The fluid 34 and the suspended crystals are then free of extraneous solvent and there is no need for further evacuation of the suspension fluid 34.

The operation is continued until the viscosity of fluid 34 has risen to a sufficient high value to indicate that the percent crystalline solids within fluid 34 has reached the desired level, for example 1–20%. The viscosity of fluid 34 may be determined by noting the increase in load on the revolving magnetic paddle 41 which is manifested by increased electric power drawn into the revolving magnetic field coils 42.

Figure 5:
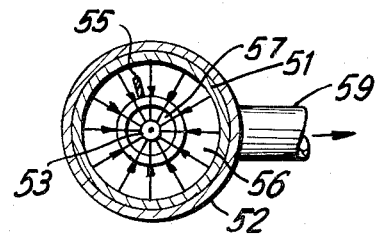
FIG. 5 is a cross section taken along line 5—5 of FIG. 4.

By using the apparatus and methods described hereinabove, it is possible to produce a substantial amount of submicron dipole particles having the desired length. However, as will be expected, a mixture of lengths will occur and the oversize can be removed by employing a continuous electrophoretic and/or centrifugal separator. Such a separator is shown in FIGS. 4 and 5 which utilizes a radial electric field applied to a suspension of particles flowing downward through a vertical tube which results in a differential radial force applied to the particles which varies with particle dimension. A separation of different particle sizes occurs radially with time. At the bottom of the tube, the fluid nearest the center of flow contains an increased proportion of larger particles. FIG. 4 shows a section through an electrophoretic device for the separation of a suspension of various lengths into narrower ranges of lengths, while FIG. 5 is a section along line 5—5 in FIG. 4 showing the radial electrical field.

The device comprises an outer tube 51 surrounded by a cylindrical electrode 52, and having a central insulated electrode 53 on the axis of the tube. A radial electric field is produced by applying the potential difference V between electrodes 52 and 53. A dipole particle 55 (FIG. 5) within the radial field aligns along a radius and is subjected to a resultant force toward the central electrode 53. The longer and thinner dipole travels faster toward the center of the tube than the thicker and shorter dipole particles.

The axial flow of the dipole suspension in fluid 56 proceeds toward the bottom of the tube where the axial stream is split into a central axial stream which proceeds through a first exit means comprising an inner tube 57 and exit pipe 58. The outer portion of the axial flow proceeds past the central orifice into a second exit means comprising outlet pipe 59. Thus, the suspension passing through in the pipe 58 contains the thinner and longer particles, while the suspension passing through the pipe 59 contains the shorter and thicker particles. Centrifugal separation may be combined with the device shown by merely rotating the device upon its axis, as indicated by the arrow 60.

Several of the foregoing electrophoretic devices may be connected in series so that a selected stream removed from a previous device may be fed to the next succeeding device so as to further improve the separation.

As an example of reactant fluids for producing herapathite crystals, the following compositions are given:

Preparation of submicron herapathite crystals

To produce submicron herapathite crystals in high concentration in a low viscosity suspending fluid, which form an optically clear, non-scattering dipole particle suspension of suitable electrodichroic ratio and sensitivity, the reacting solutions should be:
(1) miscible
(2) at maximum concentration
(3) at low viscosity
(4) at low temperature
(5) mixed rapidly over a predetermined time period An example follows:

EXAMPLE A

| No. 1: | Parts by weight |
|---|---|
| Iodine | 20 |
| Normal propanol | 80 |
| | 100 |

The iodine is dissolved in the normal propanol by heating and shaking.

| No. 2: | |
|---|---|
| Quinine bisulphate | 32.5 |
| Methanol | 67.5 |
| | 100.0 |

For complete solution warm with agitation in a hot water bath to about 70°.

No. 3:

| | |
|---|---|
| Nitrocellulose, 5–6 second type RS (Solids) | 12.5 |
| Isopropyl alcohol | 5.5 |
| Isopropyl acetate | 16.0 |
| Toluol | 16.0 |
| Methanol | 50.0 |
| | 100.0 |

Solutions Nos. 2 and 3 are then heated to 70° C. and used to prepare No. 4.

NO. 4

| | Material | Percent | Percent Solution | Solids |
|---|---|---|---|---|
| No. 2 | Quinine bisulphate | 32.5 | 12.5 | 4.06 |
| No. 3 | Nitrocellulose | 12.5 | 60.5 | 7.55 |
| Methanol | | | 13.0 | |
| Butyl acetate | | | 14.0 | |
| | | | 100.0 | 11.61 |

This solution is then warmed to 70° C. and pressure filtered at the same temperature to remove any centers of crystallization.

Solutions Nos. 1 and 4 are then placed in either of the apparatus of FIGS. 2 or 3 and mixed using either of the methods described for FIGS. 2 or 3. The resulting mixture obtained in the reaction vessel is as follows:

NO. 5

| Solution, pts. | Material | Percent | Percent Solids | Solid |
|---|---|---|---|---|
| No. 1 | 9 { Iodine / Quinine bisulphate } IQS | 20.0 / 4.06 | 1.8 / 3.7 | $^1$5.5 |
| No. 4 | 91 Nitrocellulose | 7.55 | | $^2$6.87 |
| | 100 | | 5.5 | 12.37 |

$^1$ IQS.  $^2$ N/C.

The reaction chamber in the meantime contains alkyl epoxy stearate (Celluflex-23) immersed in an acetone-Dry Ice bath at a temperature of about −70° C., the proportion being as follows:

NO. 6

| | Pts. | Material | Percent nonvolatile | |
|---|---|---|---|---|
| Solution No. 5 | 77 | { Iodoquinine sulphate / Nitrocellulose } | 5.5 / 6.87 | Suspended. |
| Celluflex-23 | 23 | Celluflex-23 | 23.0 | Solution. |
| | 100 | | 35.37 | |

The No. 6 solution in the reaction chamber is then mixed with a mechanical stirrer for about 10 minutes to insure complete reaction and homogeneity. After this, to remove the volatile solvents, suspension No. 6 is placed in an evacuator for about 2 hours and a paste is then obtained, which has a resistivity of at least 30 megohm-cm.

The analysis of the paste resulting from No. 6 after the volatiles have been removed will be as follows:

No. 7:

| | Parts |
|---|---|
| Iodoquinine sulphate | 15.5 |
| Nitrocellulose | 19.5 |
| Celluflex-23 | 65.0 |
| | 100.0 |

As a diluent for the paste there is then prepared:

No. 8:

| | Parts |
|---|---|
| Xylol | 80 |
| Butyl acetate | 20 |
| | 100 |

No. 9:

| | Parts |
|---|---|
| No. 7 | 50 |
| No. 8 | 50 |
| | 100 |

A solids analysis of No. 9 is as follows:

| | Percent concentration |
|---|---|
| Iodoquinine sulphate | 7.75 |
| Nitrocellulose | 9.75 |

The iodoquinine sulphate will contain:

| | | |
|---|---|---|
| Iodine, percent | 1.8 | 32.7 |
| Quinine bisulphate, percent | 3.7 | 62.3 |
| | 5.5 | 95.0 |

No. 9 may be used directly or in the electrophoretic and/or centrifugal separator for particle size suspension to obtain a suspension of dipoles of suitable size for use in an electrodichroic system.

A herapathite suspension prepared in this manner is characterized by elongated submicron crystals of herapathite, which remain in suspension without settling and which crystals are suitable for use as dipole particle suspensions in the practice of this invention.

Chemically, herapathite is quinine trisulphate dihydroiodide tetraiodide hexahydrate, which is the chemical name for $4C_{20}H_{24}O_2N_2 \cdot 3H_2SO_4 \cdot 2HI \cdot I_4 \cdot 6H_2O$. The molecular weight is 2,464.

Stoichiometrically herapathite contains approximately 25.8% of iodine which is approximately a ratio of iodine to quinine bisulphate of ⅓.

However, it has been found that the proportions can be varied from ½ through ¼. This is apparently due to herapathite being a molecular compound or a mixed crystal in which the proportion of the components may vary.

Moreover, the HI in the compound is present in the proportion of two moles of quinine to one of HI. The heating of the iodine solution No. 1 usually suffices to provide sufficient HI as set forth in the above example. The presence of HI in stoichiometric quantities is required to form a stable crystalline compound. An additional quantity of HI may be added to achieve the molar ratio set forth.

The speed at which the jet streams are fed into the reaction chamber in producing the desired particle sizes may range from about 10 to 1000 cm./sec., with the merged streams maintained at a residence time of reaction from about $10^{-2}$ to $10^{-6}$ seconds over a distance or height ranging from about 0.1 to 10 centimeters.

Herapathite dipole suspensions can form particle aggregates which can adversely affect the suspension stability of the system. It has been observed that when herapathite dipoles are exposed to hydrogen peroxide, ozone, or other oxidizing agents, the suspension stability is improved, apparently due to charges placed on the dipole particles from free oxygen, such that long exposure to Brownian movement tends to facilitate the break-up of particle aggregates into a great number of smaller particles. In grading a suspension by centrifuging out large particles, aggregates of smaller particles are removed, which otherwise would be useful if uniformly dispersed in the suspension. It has been observed that a herapathite fluid exposed for a long time over hydrogen peroxide (e.g. two months), and which is thereafter contrifuged, results in a suspension which is two or three times more dense (more small particles of herapathite per unit volume of solution) than if allowed to stand for one day and then centrifuged. This result is apparently due to a more efficient breakup of particle aggregates remaining after a paste of the herapathite dipoles is dispersed in the fluid.

It is therefore desirable in the light of the foregoing to insure a stabilized herapathite suspension. Tests have indicated that hydrogen peroxide ($H_2O_2$) and nitric acid ($HNO_3$), among others, to be particularly useful in achieving the desired stabilization.

In one test, a small quantity of the foregoing oxidizers was separately mixed with a larger quantity of herapathite suspension, and the suspension thoroughly agitated. The excess water was allowed to separate out at the bottom. Generally, about 1 part of oxidizer by weight to 250 parts of herapathite suspension was found satisfactory. The suspension which originally had a reddish transmission color became blue-black, indicating an improvement in dispersion and the removal of free iodine from the solution by reabsorption on to the herapathite crystal.

Suspensions of this type in cells exposed optically in a window retain their stability with little or no settling, and also retain the blue-black color. After several weeks, only a very slight reddening is noted.

Among the halogens, iodine is the only one that forms compounds in which the iodine is trivalent, such as by the direct oxidation of iodine with ozone, nitric acid or sulfuric acid. The salts formed by reaction with these compounds are derived from the hydroxide $I(OH)_3$. The effect of electrolysis on iodine chlorides or acetates indicates that iodine can form positive ions. The organic substituted iodine compounds of the iodonium series are strong bases.

The action of ozone on solid or dissolved iodine results in the compound $I(IO_3)_3$ which the literature indicates to be an iodate of iodine. It appears as a yellowish white amorphous powder which is very hygroscopic and forms a black liquid from which iodic acid crystallizes on long standing. The powder evolves iodine slowly at 75° C. and decomposes rapidly by hydrolysis at 120° C. to form $I(OH)_3$ and $HIO_3$, and when these compounds interact, iodine is formed. It is believed that what is formed is the compound $I(IO_3)_3$.

Now, the oxygen may form a surface compound or permeate into the surface where it reacts with free iodine within the herapathite crystals. The electronegative oxygen thus forms a sheath or retaining wall around the crystal which prevents the iodine from escaping from the crystal into the fluid which has some slight solubility for the iodine. Apparently, when the iodine escapes into the fluid, it is immediately surroundid by oxygen atoms, and the $I(IO_3)_3$ formed may or may not be eventually incorporated into the crystal structure. The red brown color which free iodine ordinarily imparts to the fluid changes and the fluid becomes colorless by this reaction.

The presence of ionic oxygen, $O^-$, in the fluid may change the electric charge on the surface of the suspended herapathite crystal. Since iodine may be either negative or positive, some of the herapathite crystals may have an excess of positive charge while others may have an excess of negative charge. This will eventually cause some coagulation and settling due to the attraction of the oppositely charged particles. However, with oxygen present in excess within the fluid, the strongly electro-negative oxygen tends to coat those herapathite crystals which have an excess of positive charge. The attraction previously existing between certain herapathite crystals is thus eliminated by shifting the charge distribution from $I^-+I^+$ to an $I^-+I^-$ configuration, whereupon the suspension becomes stabilized.

Thus, in the broad sense, the herapathite suspension can be stabilized by exposing the crystals to charged ions in solution. I have advantageously found that free oxygen ion-emitting compounds or agents, such as $H_2O_2$, $HNO_3$, ozone, benzoyl peroxide, and the like, to be particularly satisfactory in this regard, it being understood that positive ion-emitting compounds are also useful.

As will be appreciated by those skilled in the art, other types of dipole particles can be produced in accordance with the invention in addition to herapathite, such as metal dipoles of silver, copper, gold, and the like, using reactant solutions in which one is a reductant relative to a solution of a metal salt.

For example, in the case of silver, a 200 cc. of a 10% solution of silver nitrate (Solution A) is prepared. A 200 cc. of 30% solution of pure ferrous sulfate is prepared and mixed with 280 cc. of a 40% solution of sodium citrate to form Solution B. The ferrous solution is first preferably neutralized with a sodium hydroxide solution. Normally, when the silver solution A is mixed with the ferrous sulfate-sodium citrate solution B, a precipitate of a lilac shade is produced which takes on a deep blue color when the precipitate is filtered out. Solution A and Solution B may be treated in accordance with the invention either by the method of FIG. 2 or the aerosol method of FIG. 3. As will be appreciated, a low vapor fluid, e.g. a plasticizer, may be employed in the bottom of the reaction chamber as described hereinbefore in order to insure separation of the silver-containing dipoles in the solution.

In forming submicron dipole particles in accordance with the invention, it is advantageous that the two reactant fluids contain a readily evaporable fluid. After the dipole precipitate has formed by causing a jet stream of one to impinge upon the other at a predetermined flow rate, the reaction is stopped by adding a fluid having a low to moderate vapor pressure. Thereafter, the evaporable fluid is removed by vacuum evaporation.

Although the present invention has been described in conjunction with preferred embodiments, it is to be understood that modifications and variations may be resorted to without departing from the spirit and scope of the invention as those skilled in the art will readily understand.

What is claimed is:

1. A method of forming submicron particles of controlled average dimensions from dipole-forming reactants which comprises, providing at least two reactant fluids, mixing said reactant fluids together in substantially stoichiometric relationship to form a dipole precipitate by forming a jet stream of at least one of said reactants and a jet stream of at least one other of said reactants, and then causing said jet streams to impinge one on the other and effect mixing thereof over a predetermined distance at a predetermined flow rate to thereby form said dipole precipitate having desirable predetermined average dimensions.

2. The method of claim 1, wherein two reactant fluids are provided, one a solution of quinine bisulfate and the other a solution of iodine, the solutions when combined in accordance with the method of claim 1 forming a dipole precipitate of herapathite.

3. The method of claim 2, wherein the jet stream of the quinine bisulfate solution is passed coaxially through said jet stream of said iodine solution configurated as a hollow cone so as to intersect the iodine stream at the apex of the cone from the large end of the cone and mix therewith within a reaction chamber.

4. The method of claim 3, wherein after the solutions have been mixed by impingement of said streams, the mixed solutions are collected in said reaction chamber which is rapidly cooled to increase the supersaturation, to thereby form a predetermined large amount of nuclei and a predetermined large amount of small crystals and to inhibit the growth of large crystals of the dipole precipitate.

5. The method of forming submicron particles of controlled average dimension from two dipole-forming reactant fluids comprising the steps of converting a first one of said reactant fluids into a first charged aerosol stream of substantially submicron charged droplets of one electrical sign and converting the other of said reactant fluids into a second charged aerosol stream of substantially submicron droplets of an opposite electrical sign, thereafter said oppositely charged aerosol streams to impinge one upon the other to effect the formation of coalesced less charged substantially submicron droplets of said reactant fluids, whereby the reactant solutions in each of the coalesced droplets react to form dipole particles, collecting said reacted coalesced particles and recovering the dipole particles therefrom.

6. The method of claim 5, wherein one of said reactant fluids is a solution of quinine bisulfate and the other of said reactant fluids is a solution of iodine.

7. The method of claim 5, wherein the reaction within said coalesced droplets to form said dipole particles is induced by decreasing the solubility of said coalesced droplet solute.

8. The method of claim 7, wherein said solubility is decreased by cooling said coalesced droplets at a controlled rate.

9. The method of claim 8, wherein said solubility is further decreased by increasing said solute concentration by evaporation of said coalesced droplets.

10. A method of forming submicron particles of controlled average dimensions from dipole-forming reactants which comprises, providing at least two reactant fluids containing a readily evaporable fluid and which when mixed together in substantially stoichiometric relationship form a dipole precipitate, forming a jet stream of at least one of said reactants and a jet stream of at least one other of said reactants, causing said jet streams to impinge one on the other and effect mixing thereof over a predetermined distance at a predetermined flow rate whereby to form a dipole precipitate having desirable predetermined average dimensions, and then stopping said reaction by adding a fluid having a low to moderate vapor pressure and in which fluid said dipole precipitate is substantially non-soluble.

References Cited

UNITED STATES PATENTS

| | | | |
|---|---|---|---|
| 1,955,923 | 4/1934 | Land | 350—150 |
| 2,543,793 | 3/1951 | Marks | 350—267 |
| 2,595,616 | 5/1962 | Toulon | 350—267 |
| 3,040,625 | 6/1962 | Zito | 350—267 |

JOHN C. COOPER III, Primary Examiner

U.S. Cl. X.R.

260—284, 264—11, 12; 210—42; 259—4; 261—76; 350—267; 209—165, 180, 299, 312